United States Patent [19]
Duchaine, Jr.

[11] Patent Number: 5,622,398
[45] Date of Patent: Apr. 22, 1997

[54] PIN GRIPPING DEVICE

[76] Inventor: William Duchaine, Jr., 1630 Bucklin, LaSalle, Ill. 61301

[21] Appl. No.: 539,404

[22] Filed: Oct. 5, 1995

[51] Int. Cl.$^6$ .................................................. B65G 7/12
[52] U.S. Cl. ................ 294/16; 29/278; 294/116
[58] Field of Search .................... 294/15, 16, 28, 294/82.18, 82.32, 85, 100, 106, 115, 116, 902, 903; 24/132 WL, 136 R; 29/270, 278, 283; 254/18, 24, 29 R, 30

[56] References Cited

U.S. PATENT DOCUMENTS

| | | | |
|---|---|---|---|
| 572,952 | 12/1896 | Bird et al. | 294/116 |
| 1,243,150 | 10/1917 | Fox | 294/100 X |
| 1,298,702 | 4/1919 | Harshaw | 294/115 X |
| 1,404,674 | 1/1922 | Wille | 294/116 X |
| 1,422,185 | 7/1922 | Dalitz | 294/116 X |
| 2,068,184 | 1/1937 | Knopp | 294/100 |
| 2,544,142 | 3/1951 | Dritley | 294/115 |
| 2,800,353 | 7/1957 | Denham et al. | 294/16 |
| 2,817,492 | 12/1957 | Case | 294/116 X |
| 2,829,917 | 4/1958 | Wiora | 294/903 X |

*Primary Examiner*—Johnny D. Cherry
*Attorney, Agent, or Firm*—Leydig, Voit & Mayer, Ltd.

[57] ABSTRACT

A device for gripping a cylindrical pin. The gripping device has a pair of gripping jaws and a pair of angled levers. The gripping jaws each have interior surfaces disposed in opposing relation and defining a space between the interior surfaces to receive and engage a cylindrical pin. The angled levers each carry one of the gripping jaws near the end of the lever, the levers being further disposed to pivot in angular relation so as to vary the space between the interior surfaces of the gripping jaws and thus grip cylindrical pins of varying sizes. A lock is disposed to cooperate with the angled levers for biasing the angled levers toward each other to engage the cylindrical pin. A handle is attached to the levers for applying a force to the levers and thus to the cylindrical pin engaged by the gripping jaws, the force being directed substantially axially to the cylindrical pin.

13 Claims, 2 Drawing Sheets

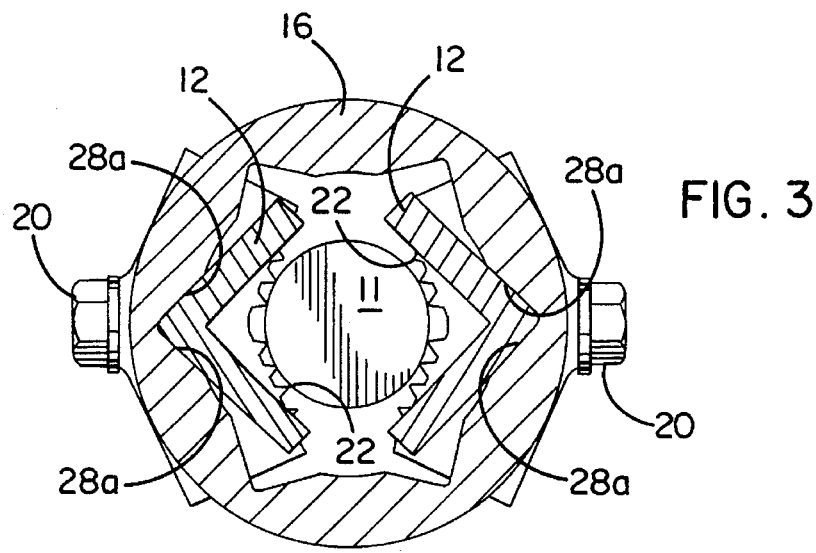
FIG. 3
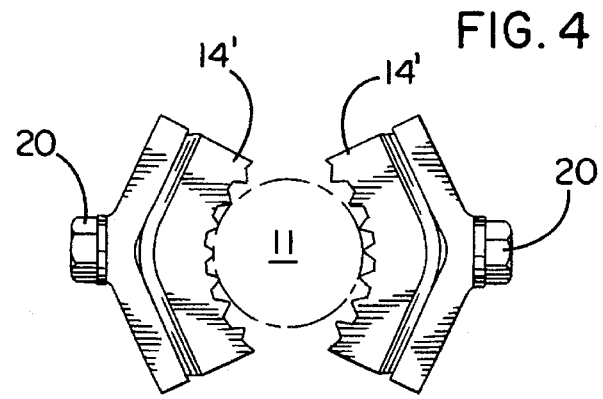
FIG. 4
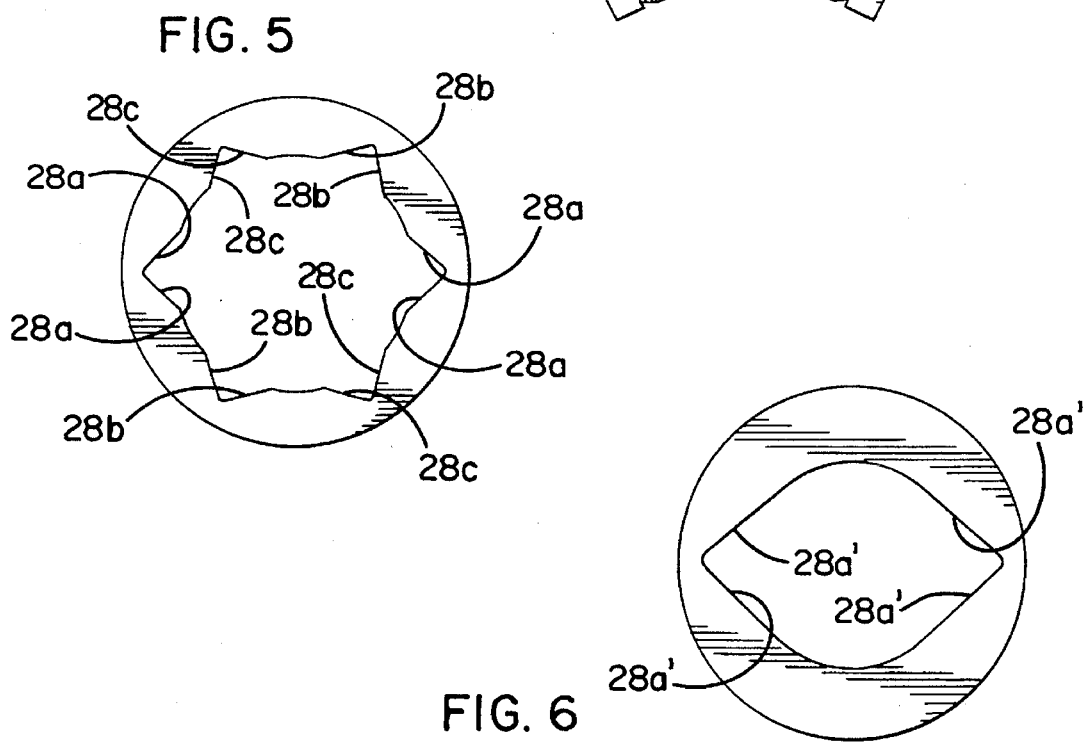
FIG. 5
FIG. 6

PIN GRIPPING DEVICE

BACKGROUND OF THE INVENTION

1. Field of the Art

The present invention relates generally to pin gripping devices, and more particularly, to a tool for gripping and applying an axial force to a pin.

2. Discussion of the Related Art

As is known in the construction industry, for example, concrete is poured to form sidewalks, foundations, and other related surfaces. During this process, forms are set up to define a cavity or space for receiving liquid or flowable concrete. These forms are typically set by large metal pins that are driven into the ground to support the forms.

After the concrete is poured and has hardened, the forms and thus the cylindrical pins must be removed. Currently, removal of the cylindrical pins is accomplished by brute force. Generally, this entails individually forcing each cylindrical pin from side to side in order to loosen them—sometimes with a sledge hammer. Next, the cylindrical pins are individually gripped with a gripping device, such as a pipe wrench or vice grips, and pulled and twisted until they are removed from the ground. It can be appreciated that this process requires a construction worker to expend a lot of time and energy in order to remove the form-supporting cylindrical pins. Accordingly, there is a great need for a gripping device that will simplify or ease this process.

SUMMARY OF THE INVENTION

Accordingly, it is a primary object of the present invention to provide an effective means for pulling cylindrical pins by providing a device for readily applying an axial force to a cylindrical pin in order to remove embedded cylindrical pins from the ground.

Another object of the present invention is to provide a device adapted to remove such pins cost effectively.

Still another object of the present invention is to provide a device for removing cylindrical pins from the ground, and that is readily adapted to grip cylindrical pins of varying size.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a device for gripping a cylindrical pin. The gripping device has a pair of gripping jaws and a pair of angled levers. The gripping jaws each have an interior surface and are disposed in opposing relation to define a space between the interior surfaces to receive and engage a cylindrical pin. The angled levers each carry one of the gripping jaws near the end of the lever, the levers being further disposed to pivot in angular relation so as to vary the space between the interior surfaces of the gripping jaws and thus grip cylindrical pins of varying sizes. A locking means is disposed to cooperate with the angled levers for biasing the gripping jaws toward each other to engage the cylindrical pin. A handle is attached to the levers for applying a force to the levers and thus to the cylindrical pin engaged by the gripping jaws, the force being directed substantially axially to the cylindrical pin.

In a preferred embodiment of the present invention the angled levers are attached at the ends opposite the lever ends that carry the gripping jaws. The gripping jaws are angular and the portions of the interior surfaces of the gripping jaws which engage cylindrical pins include a toothed region in order to increase their grip on cylindrical pins. The locking means allows the angled levers to lock at an adjustable angle to grip pins of varying size. Furthermore, the locking means preferably comprises a ring having an inner surface that defines a plurality of opposing regions, each of the opposing regions being diametrically spaced apart by predetermined distances and shaped to substantially conform to the angled levers. Thus, the predetermined distance will vary so that any given set of opposing regions may be aligned with the angled levers to facilitate the gripping of varying sized cylindrical pins at an optimal angle. Finally, the handle includes a rod that is substantially transversely connected to the angled levers.

BRIEF DESCRIPTION OF THE DRAWINGS

FIG. 3 is a cross sectional view of the pin gripping device taken substantially along line 3—3 of FIG. 1;

FIG. 4 is an end view showing gripping jaws in accordance with an alternative embodiment of the invention;

FIG. 5 is a top view of the preferred locking ring for the gripping device; and

FIG. 6 is a top view of an alternative locking ring for the gripping device.

DETAILED DESCRIPTION OF THE PREFERRED EMBODIMENTS

Figure 1:
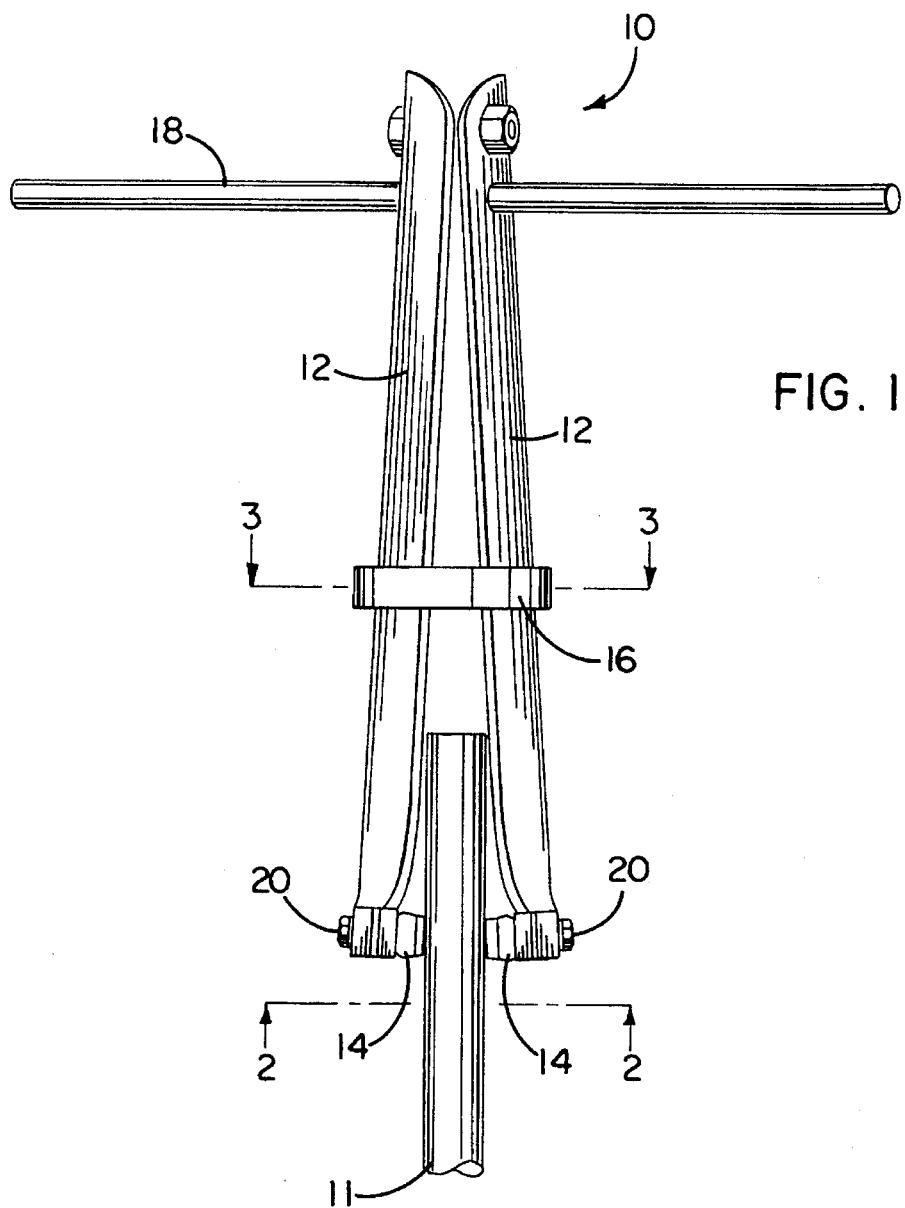
FIG. 1 is a side view of a pin gripping device in accordance with the present invention.

Referring now to the drawings, FIG. 1 shows a device 10 for gripping and applying an axial force to a cylindrical pin 11. Generally, the gripping device 10 comprises a pair of angled levers 12 disposed to pivot near one end and carry a pair of gripping jaws 14 near the other end. As will be more particularly described below, a locking ring 16 serves to urge the levers 12 and therefore the gripping jaws 14 together, and a handle 18 provides a ready means for applying an axial force to the pin 11. The device 10 operates by manually retracting the locking ring 16 and pivoting the levers 12 so as to expand the gripping jaws 14 and receive the cylindrical pin 11 to be pulled. Then, the gripping jaws 14 are closed upon the pin 11 and the locking ring 16 is forced upon the angled levers 12, as close as possible to the gripping jaws 14. This urges the gripping jaws 14 together to engage the pin 11. Thereafter, force may be exerted upon the handle 18 to retract the pin 11. If necessary, the handle 18 may be rotated back and forth to loosen the pin 11, before applying a force in the axial direction.

It has been found that when using the device 10 with the gripping jaws 14 directed downwardly, the force of gravity is sufficient to retain the locking ring 16 in place. Alternatively, a set screw (not shown) may be provided in connection with the locking ring 16 to ensure that it remains firmly in place. Such an embodiment may be preferred if the pin 11 is disposed overhead and the device 10 is directed upwardly.

Figure 2:
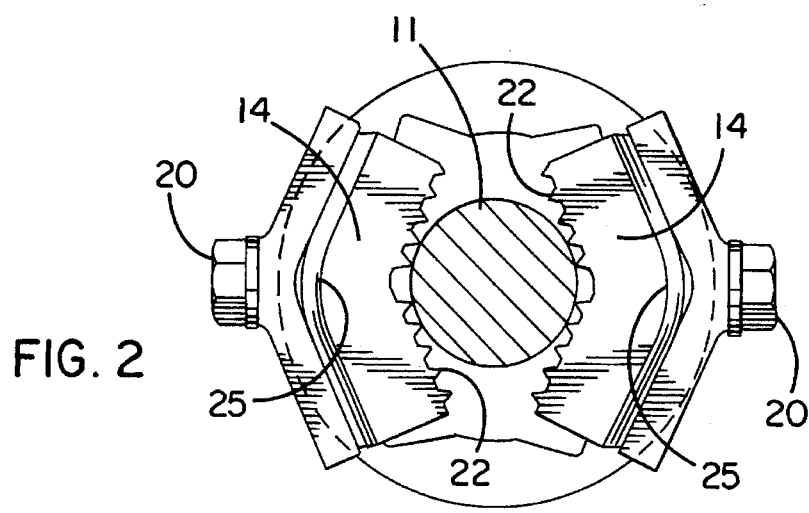
FIG. 2 is a cross sectional view of the pin gripping device taken substantially along line 2—2 of FIG. 1.

To more specifically describe the gripping jaws 14, reference is made to FIG. 2, which shows a cross-sectional view of the gripping jaws 14. As illustrated, the gripping jaws 14 are attached, as by bolt 20, to the levers 12, near one end. The gripping jaws are angled to define concave inner surfaces that are disposed to engage the cylindrical pin 11. Preferably, these inner surfaces include a plurality of teeth 22 to enhance the engagement with the cylindrical pin 11, and thus the gripping force of the device 10. In this regard, it is also preferred that the gripping jaws 14 are made from hardened steel, so that extreme forces may be applied without deforming or distorting the teeth 22, and thus facilitate long-term, repeated use of the device 10.

As illustrated in the preferred embodiment of FIG. 2, the gripping jaws 14 have a relatively soft angle at 25. As a result, a single set of gripping jaws 14 is readily adapted for gripping various diameter cylindrical pins 11. As illustrated with the particular pin 11 shown in FIG. 2, the inner teeth 22 of gripping jaws 14 engage and grip the pin 11, while the outer teeth do not. It will be appreciated, however, that if the pin were substantially larger (diametrically), then the outer teeth 22 of gripping jaws 14 would engage the pin, instead of the inner teeth 22.

An alternative set of gripping jaws 14' is illustrated in FIG. 4. As illustrated, the inner surfaces of the jaws 14' are more arcuately-shaped than those of jaws 14 shown in FIG. 2. Therefore, for a cylindrical pin 11 of the size illustrated, more teeth 22 will engage the pin 11, and thus improve the gripping force. Indeed, it will be appreciated that gripping jaws could be provided having arcuately-shaped inner surfaces that precisely correspond to the curvature of the cylindrical pin 11. Such an embodiment would be preferred when, for example, only pins of a single, uniform size were being pulled. Alternatively, such an embodiment may also be preferred when, for example, a uniformly sized pin were to be repeatedly pulled at a given job-site. In this circumstance (i.e., from job to job), gripping jaws of a particular, desired size may be installed for a given task by way of bolt 20. Therefore, when a new size pin is to be pulled, jaws of a different size may be installed on the device 10.

Referring again to FIG. 1 and as previously mentioned, the angled levers 12 each carry one of the gripping jaws 14 near the end of each lever 12. The levers 12 are further disposed to pivot about a point near the other end in angular relation so as to vary the space between the interior surfaces of the gripping jaws 14, and thus grip cylindrical pins 11 of varying sizes. The angled levers 12 can have a wide range of lengths and, alternatively, can be pivotally attached at an intermediate point (as opposed to the end as illustrated). As will be understood by those skilled in the art, the angle formed by the levers 12 depends on factors which include: (1) the relative point at which the levers 12 are pivotally attached, (2) the length of the levers 12, and (3) the diameter of the cylindrical pin 11.

For example, for a given cylindrical pin 11 diameter, a relatively large angle can be obtained by either using shorter levers 12 or by pivotally attaching the levers 12 closer to the gripping jaws 14. As will be more specifically described below, the angle of the levers 14 will dictate the ability of the locking ring 16 to lock the jaws 14 onto a pin 11, and the amount of torque that may be applied to the pin 11. For example, extremely long levers 12 that define a very small angle will generally not be as "stiff" and thus will limit the torque that can be applied to the pin 11. Although the device 10 in accordance with the present invention is intended to facilitate the application of an axial force to a pin 11, it will be appreciated that providing a structure that promotes the application of a torque to the pin 11 as well, will facilitate the removal of tightly embedded pins 11 (i.e., by allowing a user to rotate the handle 18 back and forth).

A broad aspect of the present invention is to provide a locking means that will lock the levers 12 at an adjustable angle, and thus facilitate the gripping of various size cylindrical pins 11. This is preferably accomplished by the locking ring 16 as illustrated in FIGS. 1, 3, and 5. FIG. 5 is a top view of the preferred locking ring 16. FIG. 1 illustrates the manner in which the locking ring 16 is sleeved over the levers 12 to bias the levers 12 together and thus urge the gripping jaws 14 against the cylindrical pin 11, and FIG. 3 illustrates the engagement between the locking ring 16 and the levers 12.

More specifically, opposing inner surfaces 28a are provided on the locking ring 16, which substantially conform to the outer surface of the levers 12. Preferably the levers 12 are angle irons and, therefore, surfaces 28a are angled to conform accordingly (See FIG. 3). It is also preferred to provide opposing inner surfaces 28b and 28c in locking ring 16. Although perhaps not readily apparent from FIG. 5, each of opposing surfaces 28a, 28b, and 28c are separated by a different distance. That is, the diameter spanning the opposing surfaces is varied among the three pairs.

In practicing the invention, it is desired to slide the locking ring 16 as close as possible to the gripping jaws 14 to permit a greater torque to be exerted upon the pin 11. As previously discussed, when the device 10 is used to grip pins 11 having differing diametric sizes, the angle of the levers 12 will necessarily vary. Providing varied spacing of the plurality of opposing inner surfaces 28a, 28b, and 28c allows the ring 16 to be secured close to the gripping jaws 14 simply by rotating the ring 16 to align the appropriate inner surface pair with the levers 12.

FIG. 6 shows an alternative locking ring 16' for use with the present invention. This locking ring 16' has only a single pair of opposing inner surfaces 28a'. As will generally be appreciated, when this embodiment is used, the position of the locking ring 16' along the levers 12 will be determined by the diametric size of the cylindrical pin 11. Alternatively, a plurality of locking rings 16' may be provided, wherein each ring 16' is of a different size. Therefore, the ring 16' may be maintained in close proximity to the gripping jaws 14, merely by choosing a particular sized ring 16' for a given cylindrical pin 11.

Although the locking means of the present invention has been described in connection with the locking rings 16 and 16' it should be appreciated that, consistent with the concepts and teachings of the present invention, alternative locking means may be utilized. Indeed, for purposes of the present invention, any device which serves to inwardly bias the gripping jaws 14 against the cylindrical pin 11 will achieve the broad function of the locking means. For example, an elastic band may be tightly wrapped around the levers 12 near the gripping jaws 14 to inwardly bias the jaws 14.

Finally, a handle 18 is attached to the levers 12 for applying a force to the levers 12 and thus to a cylindrical pin 11 engaged by the gripping jaws 14; the force being directed substantially axially to the cylindrical pin 11. In achieving this function, applicant placed important consideration on defining a handle 18 that is low cost, strong, durable, and easy to grip. It will be appreciated that there are a number of ways to implement the broad functional feature of a handle. In its preferred embodiment, however, the handle 18 is in the form of a cylindrical rod that is readily attached to the levers 12 by transversely sliding the rod through a receiving bore in the levers.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A gripping device for gripping a cylindrical pin comprising:

a pair of gripping jaws having interior surfaces, the gripping jaws disposed in opposing relation and defining a space between the interior surfaces to receive and engage a cylindrical pin;

a pair of levers disposed in angled relation, each lever carrying one of the gripping jaws near a first end of the lever, the levers being further disposed to pivot in angular relation so as to vary the space between the interior surfaces of the gripping jaws and thus grip cylindrical pins of varying sizes, the levers being lengths of angle iron disposed to present an irregular outer surface having angled surface projections on opposite sides of the cylindrical pin;

a locking ring surrounding the angled levers for biasing each lever toward the other in order to engage the cylindrical pin, the locking ring having an inner surface which conforms to the angled surface projections of the levers to firmly lock the levers to allow application of torque to the cylindrical pin;

a handle attached to the levers for applying a force to the angled levers and thus to the cylindrical pin engaged by the gripping jaws.

2. The gripping device according to claim 1 wherein the interior surfaces of the gripping jaws include a toothed region to promote the engagement between the interior surfaces of the gripping jaws and the cylindrical pin.

3. The gripping device of claim 1 wherein the gripping jaws are arcuately shaped.

4. The gripping device of claim 1 wherein the gripping jaws are angular.

5. The gripping device of claim 1 wherein the levers are pivotally attached to one another at an intermediate point on each lever.

6. The gripping device of claim 1 wherein the inner surface of the ring defines two opposing regions, each region conforming to the angled surface projections of the levers.

7. The gripping device of claim 1 wherein the inner surface of the ring defines a plurality of opposing regions, each of the opposing regions conforming to the angled surface projections of the levers.

8. The gripping device of claim 7 wherein each of the opposing regions of the inner surface are diametrically spaced apart by predetermined distances, the distances varying so that any given set of opposing regions may be aligned with the levers to facilitate the gripping of varying sized cylindrical pins at varying lever angles.

9. The gripping device of claim 1 wherein the handle includes a rod that is transversely connected to the levers.

10. The gripping device of claim 1 wherein each angled surface projection consists of two flat planes meeting at a 90 degree angle, a pair of the projections being disposed such that the 90 degree angles are diametrically opposed.

11. The gripping device of claim 1 wherein the inner surface of the locking ring has a pair of diametrically opposed regions, the pair of regions conforming to the 90 degree angled surface projections.

12. The gripping device of claim 1 wherein the inner surface of the locking ring has multiple pairs of diametrically opposed regions, each pair of regions conforming to the 90 degree angled surface projections.

13. A gripping device gripping a cylindrical pin comprising:

a pair of gripping jaws having interior surfaces, the gripping jaws disposed in opposing relation and defining a space between the interior surfaces to receive and engage a cylindrical pin;

a pair of levers disposed in angled relation, each lever carrying one of the gripping jaws near a first end of the lever, the levers being further disposed to pivot in angular relation so as to vary the space between the interior surfaces of the gripping jaws and thus grip cylindrical pins of varying sizes, the levers further being pivotally attached to one another near a second end of the lever;

a locking means disposed to cooperate with the angled levers for biasing each lever toward the other in order to engage the cylindrical pin; and a handle attached to the levers for applying a force the gripping jaws, wherein the handle is attached to each lever at an intermediate point on each lever, which point lies between the point at which the levers are pivotally attached to one another and the end of the levers which carries the gripping jaws.

* * * * *